(12) United States Patent
Lin

(10) Patent No.: US 9,424,438 B2
(45) Date of Patent: Aug. 23, 2016

(54) PRIVACY LEAKAGE PROTECTION

(71) Applicant: Wei Lin, Shanghai (CN)

(72) Inventor: Wei Lin, Shanghai (CN)

(73) Assignee: SAP SE, Walldorf (DE)

( * ) Notice: Subject to any disclaimer, the term of this patent is extended or adjusted under 35 U.S.C. 154(b) by 181 days.

(21) Appl. No.: 14/230,010

(22) Filed: Mar. 31, 2014

(65) Prior Publication Data
US 2015/0278550 A1     Oct. 1, 2015

(51) Int. Cl.
*G06F 21/62* (2013.01)
*H04L 29/06* (2006.01)

(52) U.S. Cl.
CPC ........... *G06F 21/6263* (2013.01); *H04L 63/04* (2013.01); *H04L 63/0428* (2013.01); *H04L 63/06* (2013.01)

(58) Field of Classification Search
CPC .............. G06F 21/6263; H04L 63/06; H04L 63/0428; H04L 63/04
USPC ........................................................ 713/153
See application file for complete search history.

(56) References Cited

U.S. PATENT DOCUMENTS

| | | | |
|---|---|---|---|
| 7,904,710 B2 | 3/2011 | Rits et al. | |
| 8,220,047 B1 | 7/2012 | Soghoian et al. | |
| 8,504,846 B2 | 8/2013 | Nguyen et al. | |
| 8,548,172 B2 | 10/2013 | Kerschbaum | |
| 8,572,405 B2 | 10/2013 | Kerschbaum | |
| 8,583,915 B1 | 11/2013 | Huang | |
| 8,776,214 B1 * | 7/2014 | Johansson | H04L 63/0823 713/170 |
| 2002/0062342 A1 | 5/2002 | Sidles | |
| 2004/0068649 A1 | 4/2004 | Haller et al. | |
| 2006/0195583 A1 | 8/2006 | Bellifemine et al. | |
| 2008/0172745 A1 | 7/2008 | Reinart et al. | |
| 2010/0114839 A1 | 5/2010 | Krishnamurthy et al. | |
| 2010/0235627 A1 | 9/2010 | Kerschbaum et al. | |
| 2011/0126290 A1 | 5/2011 | Krishnamurthy et al. | |
| 2011/0162074 A1 | 6/2011 | Helfman et al. | |
| 2012/0036370 A1 | 2/2012 | Lim et al. | |
| 2013/0191494 A1 * | 7/2013 | Sidhu | H04L 67/34 709/217 |
| 2013/0346314 A1 | 12/2013 | Mogollon et al. | |
| 2014/0089684 A1 | 3/2014 | Guo et al. | |
| 2014/0173708 A1 * | 6/2014 | Garlick | H04L 63/08 726/7 |

OTHER PUBLICATIONS

LastPass Manual retrieved from Mar. 13, 2013 image on the internet archive.*
How to Make a Secure Login Form with SSL https://www.sslshop-percom/article-how-to-make-a-secure-login-form-with-ssl.html Jan. 29, 2011.*

* cited by examiner

*Primary Examiner* — Kambiz Zand
*Assistant Examiner* — Benjamin Kaplan
(74) *Attorney, Agent, or Firm* — Horizon IP Pte. Ltd.

(57) ABSTRACT

A client device securely transfers personal information to a third-party website. The client device stores personal information of a user and encrypts personal information requested by the third-party website, so that the third-party website can decrypt and retrieve the personal information, and so that a remote proxy server facilitating the transfer of personal information from the client device to the third-party website cannot read the encrypted personal information and has no access to unencrypted personal information.

19 Claims, 8 Drawing Sheets

FIG. 6

Phone Number

| Name | Phone number 1 | Phone number2 |
| --- | --- | --- |
| ☐ Me | 123456789 | 987654321 |
| ☐ My Wife | 345678912 | 219876543 |

ID

| Name | ID |
| --- | --- |
| ☐ Me | XXXXXXX |
| ☐ My Wife | XXXXXXX |

Birthday

| Name | Birthday |
| --- | --- |
| ☐ Me | 12-26-1978 |
| ☐ My Wife | 11-21-1988 | transport token:

Upload

FIG. 7

PRIVACY LEAKAGE PROTECTION

BACKGROUND

Big data is a hot topic, and more and more people are finding serious privacy issues with the big data age. For example, a user's personal information can often be very easily disclosed. User personal information, such as address, passport number, or even credit card numbers are frequently stored by many and various websites, based on interactions with the websites. When a website's security protection measures are compromised, user personal information is at risk of being disclosed.

In some cases, users can request that the websites they interact with not store their personal information any longer than necessary. For example, they can request that personal information, such as home address, telephone numbers, etc., be deleted when a transaction is complete or an order is fulfilled, and the goods or services have been delivered. However, in some cases it is also possible for the personal information to be read, stored, or intercepted at servers facilitating the transfer of information.

Additionally, if a website does not retain users' personal information, it can be inconvenient, tedious, and time-consuming for them to frequently or repetitively input the personal information, such as home address and billing address information, for example, into the website's order entry forms. In such cases, they have to make a choice between security of their personal information and their personal convenience.

SUMMARY

A framework for securely transferring personal information to a third-party website is described herein. In accordance with one aspect, a client device stores personal information of a user and encrypts personal information requested by the third-party website, so that the third-party website can decrypt and retrieve the personal information, and so that a remote proxy server facilitating the transfer of personal information from the client device to the third-party website cannot read the encrypted personal information and has no access to unencrypted personal information.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 6 is an illustration of an example user interface of a client device display;

FIG. 7 is an illustration of another example user interface of a client device display.

DETAILED DESCRIPTION

Figure 1:
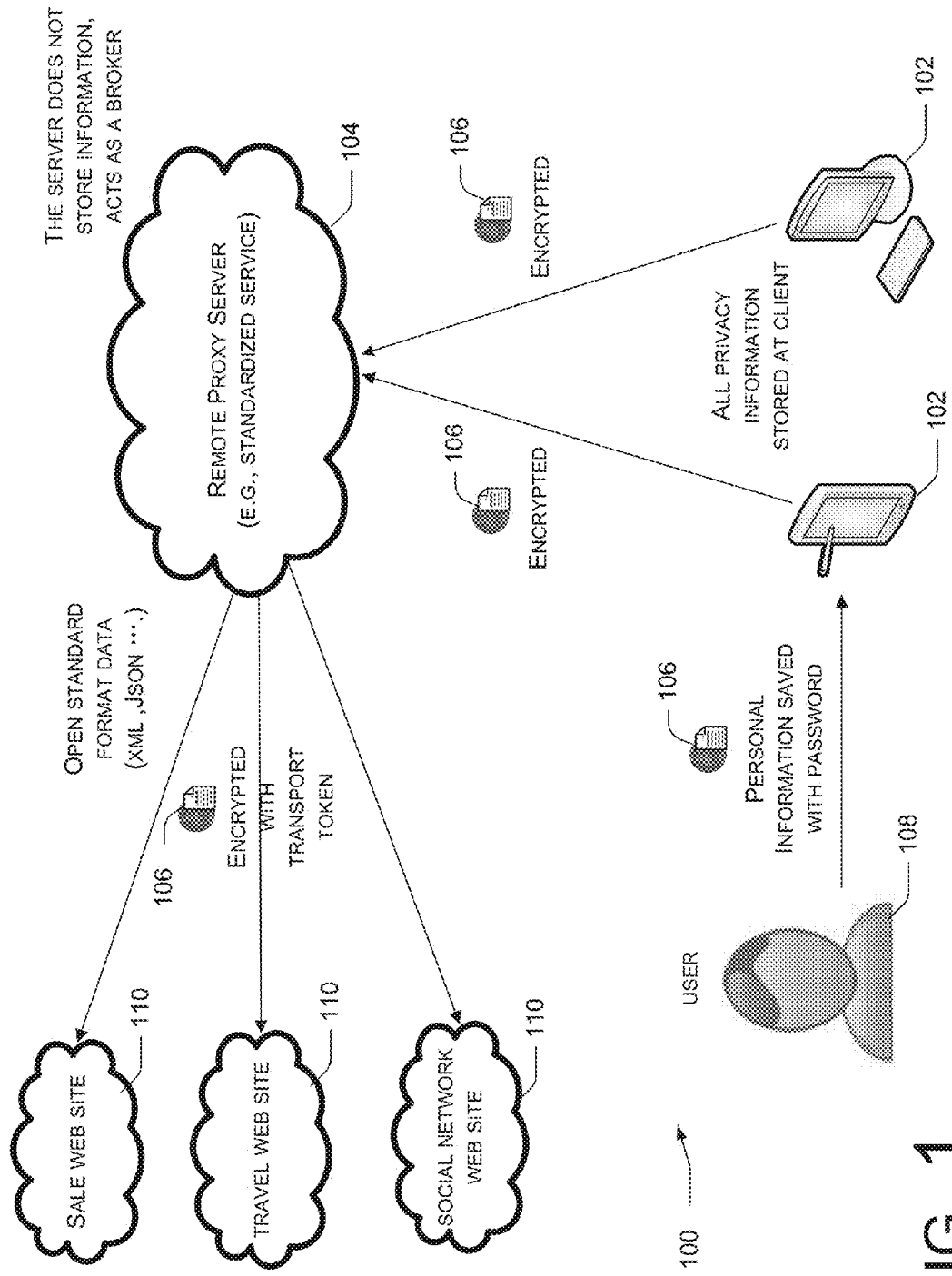
FIG. 1 is a block diagram of an example environment, wherein the techniques and devices discussed herein may be implemented.

Various devices, systems, and techniques for securely transferring personal information from a client device to a third-party website are disclosed, according to example embodiments. In an implementation, the client device stores personal information of a user locally at the device. The client device encrypts personal information requested by a third-party website, so that the third-party website can decrypt and retrieve the personal information, and so that a remote proxy server facilitating the transfer of personal information from the client device to the third-party website cannot read the encrypted personal information and has no access to unencrypted personal information.

In one embodiment, a transport token is received at the client device, and is used by the client device to encrypt the personal information for upload to the third-party website. For example, the transport token may be received from the third-party website, and it may be used by the third-party website to decrypt and retrieve the personal information.

In another implementation, the transport token may be used by a user to authorize the transfer of information, when a request is made by a third-party website. For example, receiving the transport token at the client device from the third-party website may indicate the third-party website's participation in a secure data transfer technique. Further, the client device may be registered to participate in the secure data transfer technique to one or more remote proxy servers arranged to facilitate personal information transfer.

The transport token may be displayed to the user on a display of the client device, along with the request for information. In one implementation, the transport token is displayed to the user on a display of the client device along with the user's stored personal information associated with the request from the third-party website. For example, the client device may automatically retrieve the personal information, saving the user from having to enter it. The user may input the transport token into the client device, for example, as part of authorizing the transfer of the personal information displayed.

Various devices and techniques for securely transferring personal information from a client device to a third-party website are disclosed. For ease of discussion, the disclosure describes client devices with respect to personal mobile computing devices, such as smartphones, tablets, and the like. However, the examples described are not intended to be limiting, and other computing and/or communications devices and systems are also within the scope of the disclosure. Further, remote servers arranged in a cloud computing environment are used as examples in various implementations. However, the descriptions of remote servers are also applicable to servers and server instances in other computing environments, networks, other forms and types of computing models, and the like.

In various implementations, fewer, alternate, or additional components may be included within client devices or information transfer systems to perform various portions of described techniques while remaining within the scope of the disclosure.

FIG. 1 shows an example environment, illustrating a system 100 wherein the techniques and devices discussed herein may be implemented. In the example, the system 100 includes one or more client devices 102 along with one or more remote proxy servers ("servers") 104 arranged to transfer personal information 106 of a user 108 to at least one third-party website ("site") 110. In various embodiments, the system 100 includes fewer, additional or alternate components within which differently arranged structures may perform the techniques discussed within the disclosure.

In various examples, the user 108 desires goods or services made available at a site 110, accessed via the Internet or other network. For example, the site 110 may include a commercial website selling goods or services (such as a retail sales site or a travel services site, for instance), a social networking site, gaming site (where the user 108 can purchase credits or premiums, etc.), or the like. The user 108 may use one of the client devices 102 to view the content of the site 110, for instance. The user 108 may also use a client device 102 to complete a transaction with the site 110, such as completing an order entry form for example, for the desired goods or services.

In various implementations, the user 108 may desire to transfer personal information 106 to the site 110 to pay for the goods or services, to inform of the billing address, to designate a delivery location, and the like. In some examples, the site 110 may have a policy of storing the user's information 106 until completion of the transaction, when it is no longer needed. At that point the site 110 deletes the personal information 106, thus minimizing the risk of disclosure of a security breach.

In an implementation, as shown in FIG. 1, the user 108 may transfer the personal information 106 to the site 110 using the client device 102. Additionally, one or more remote proxy servers 104 may facilitate the transfer of the personal information 106. For example, a server 104 may receive the personal information 106 from the client device 102 and relay the information 106 to the site 110. Accordingly, it is desirable that the personal information 106 remain secure during the transfer, including through the server(s) 104.

Figure 2:
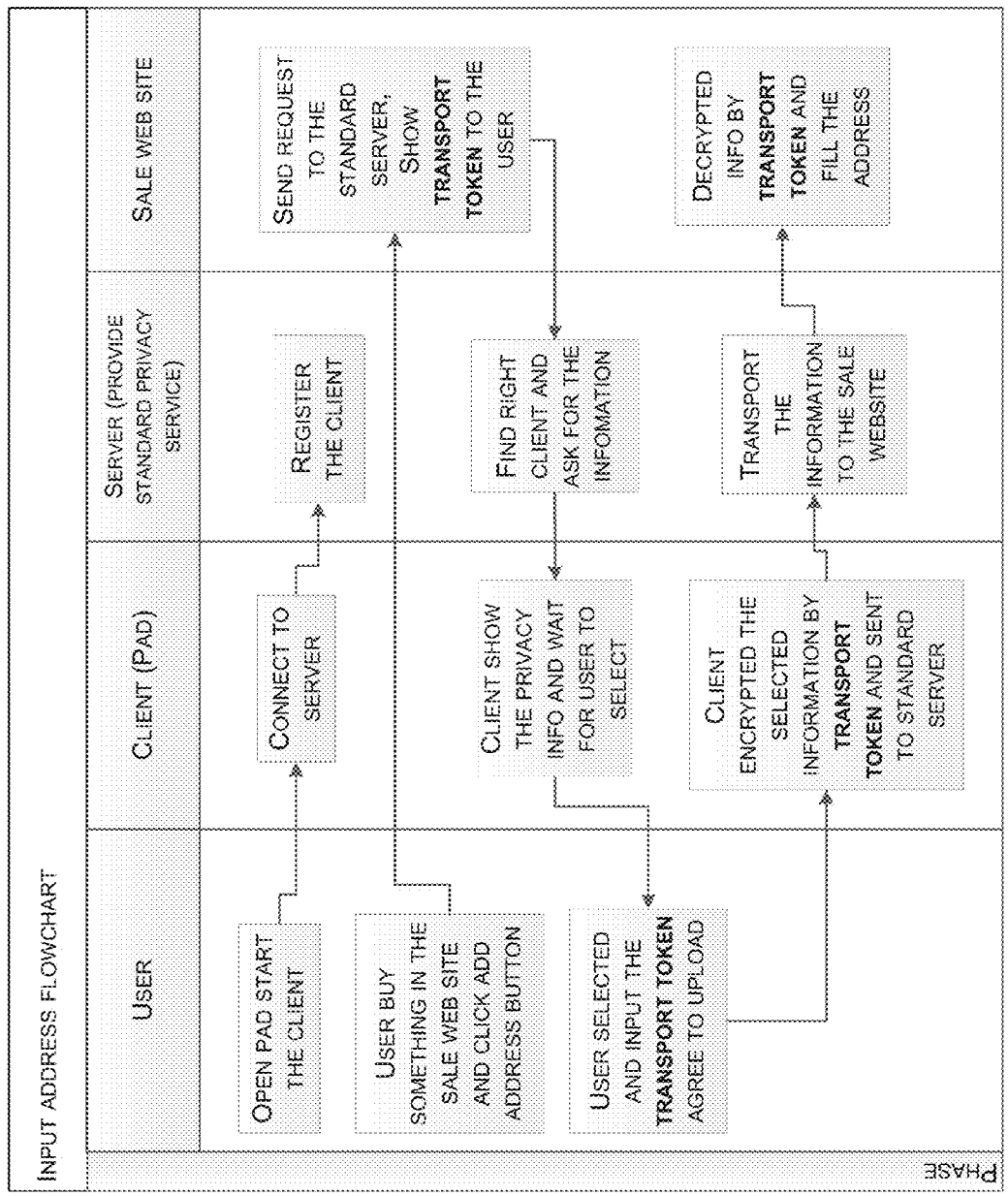
FIG. 2 is a flow diagram illustrating an example transfer of personal information, and example associated components facilitating the transfer, according to an implementation.
Figure 3:
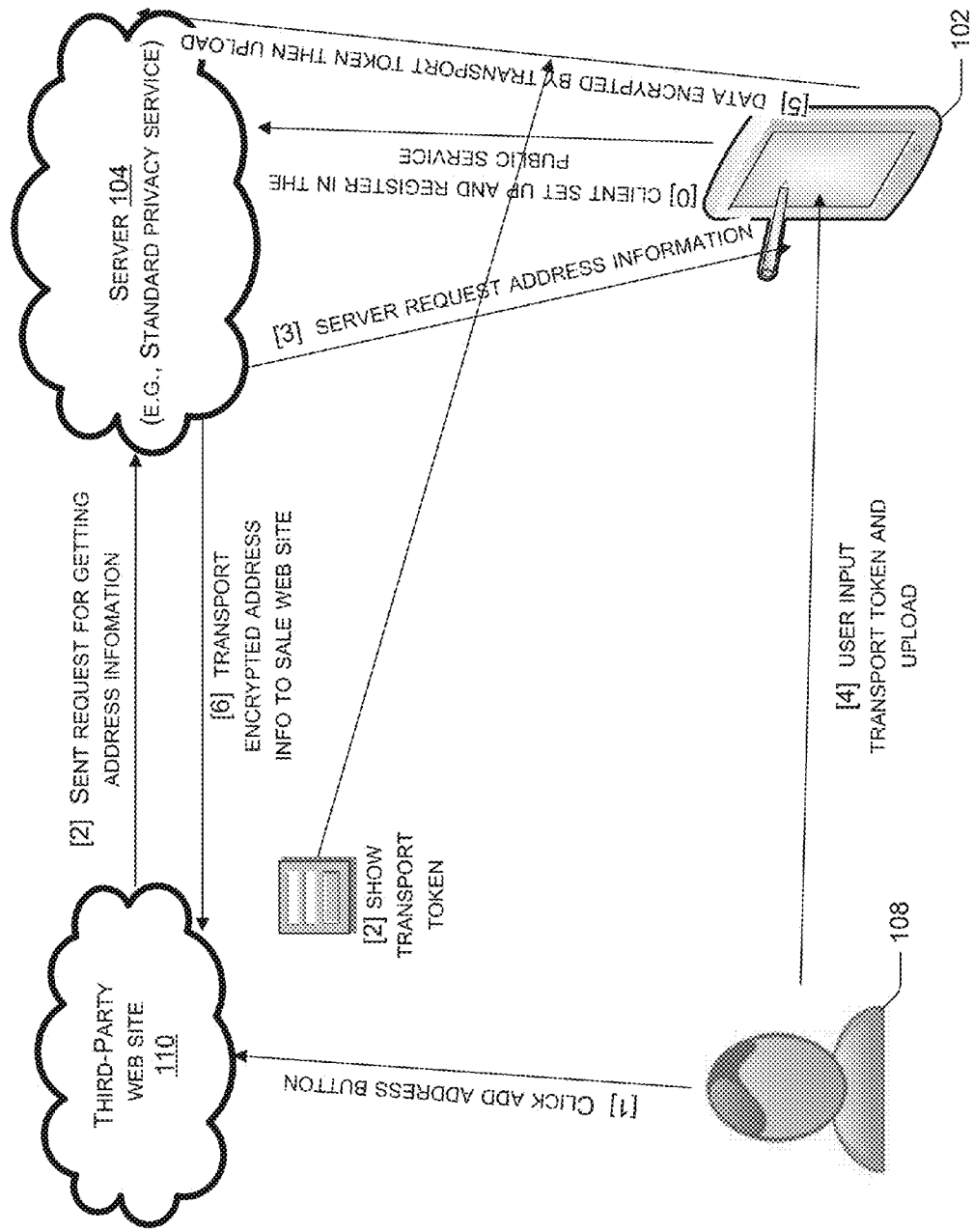
FIG. 3 is a block diagram graphically illustrating the example transfer of personal information described at FIG. 2.

Referring to FIGS. 1-3, example operation of a system 100, including a client device 102, is described. In an implementation, the client device 102 is equipped with hardware, firmware, software, and the like for participation in network communications, such as via the Internet. In one implementation, specialized software or firmware may be installed at the client device 102 to facilitate the secure transfer of personal information 106.

In an implementation, the client device 102 may be registered with one or more proxy servers 104 to participate in a secure information transfer technique. As shown in FIG. 2, the client device 102 may connect to a server 104 to register the client device 102 with the one or more servers 104 (see FIG. 3 at [0]). In some implementations, the server(s) 104 may be part of a public or private infrastructure or service, such as a standardized commercial service, for example, arranged for users to transfer information during transactions, such as commercial transactions, or the like.

In various implementations, the personal information 106 of the user 108 is stored locally at the client device 102, and may be secured via a password or other security scheme. The user 108 may indicate a desire to send at least a portion of his or her personal information to a site 110, as part of a transaction with the site 110. For example, the indication may be an input via the client device 102, for example, such as clicking an "add address" button, as shown in FIG. 3 at [1], or the like. In response to the user input, the site 110 sends a request to the server 104, to show a transport token to the user 108 via the client device 102, and to retrieve the personal information 106 (FIG. 3 at [2]). In various implementations, the transport token is supplied by the site 110, and is also generated by the site 110 in some instances. Otherwise, the site 110 may supply the transport token via a contracted service, or the like.

In an implementation, the server 104 receives the transport token from the third-party website 110 and sends the transport token to the client device 102. In the implementation, based on the client device 102 registering with the server(s) 104, a server 104 is able to locate and identify the client device 102 of the user 108 during a site 110 request, and to show the transport token on the client device 102 while requesting the personal information 106 (FIG. 3 at [3]). For example, in one implementation, the transport token and the request are displayed via a user interface (such as UI 600 shown in FIG. 6, for example) of a display of the client device 102.

Figure 5:
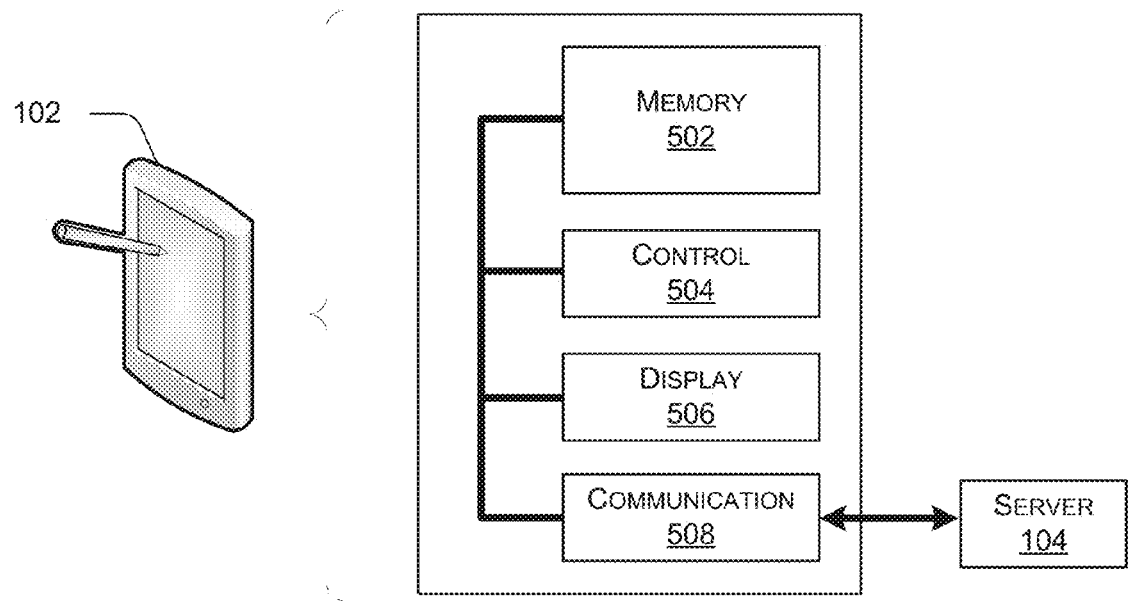
FIG. 5 is a block diagram of an example client device, showing example component modules.

In one implementation, the personal information 106 associated with the request from the site 110 is automatically retrieved from the memory 502 (as shown in FIG. 5) of the client device 102, and is displayed at the client device 102, along with the transport token, for verification by the user 108. In other implementations, the user 108 may indicate the personal information to be retrieved from the memory 502 of the client device 102 by selecting it from a menu, or the like (see FIG. 7, for example). Alternately, the user 108 may input the personal information 106 into a form displayed at the client device 102, for example.

In an implementation, once the personal information 106 is verified by the user, the personal information 106 is encrypted by the client device 102 using the transport token. In one example, the user 108 verifies the information 106 and authorizes the transfer of the information 106 to the site 110 by entering the transport token into a field or form, for example, via the client device 102 (see FIG. 3 at [4]). Alternately, the user 108 takes other actions to verify and authorize the information 106 transfer.

In an implementation, the encrypted personal information 106 is uploaded to the server 104 (FIG. 3 at [5]). The server 104 transfers the encrypted information 106 to the site 110, without being able to read the information 106 (FIG. 3 at [6]), providing for a secure information 106 transfer. For example, the server 104 is not able to read the encrypted personal information 106, and is not exposed to any unencrypted personal information 106. In various implementations, the server 104 communicates with the client device 102 and/or the third-party website 110 via one or more standardized open data formats or protocols (e.g., odata, xml, json, etc.). In the implementations, the site 110 decrypts the personal information 106 and uses it to complete the transaction or fulfill the order for the user 108.

Figure 4:
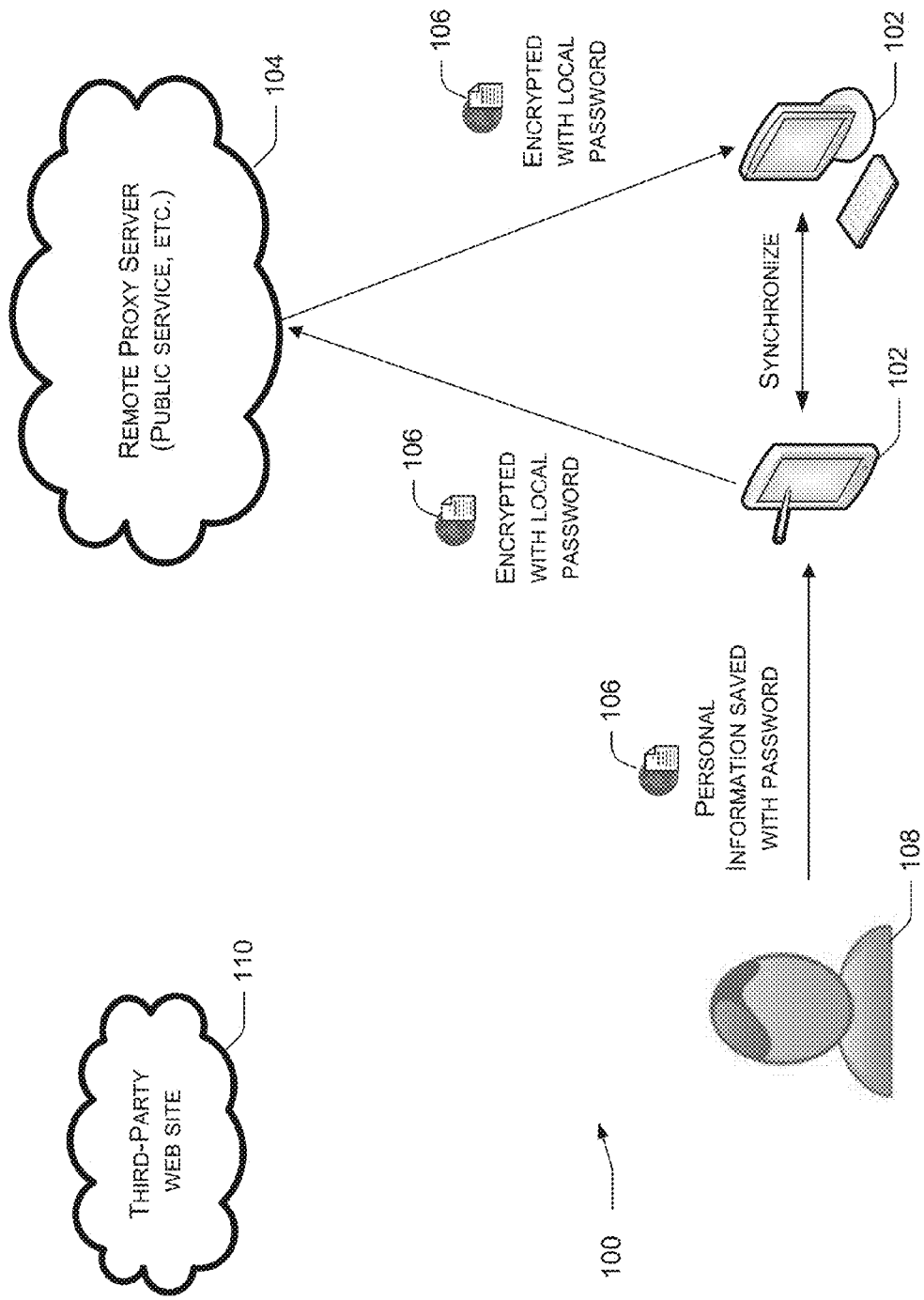
FIG. 4 is a block diagram graphically illustrating a synchronization of personal information between client devices.

In an implementation, as shown in FIG. 4, the server 104 may be used to facilitate a synchronization of personal information 106 between two or more client devices 102 used by a user 108. For example, the synchronization technique includes encrypting the personal information 106 stored at one client device 102 via a password or other security scheme, and transferring the encrypted information 106 to another client device 102 via the server 104. For example, the encrypted information 106 is uploaded to the server 104 by the one client device 102 and the server 104 downloads the encrypted information 106 to the other client device 102. As in the transactions described above, with synchronization, the server 104 is not able to read the encrypted personal information 106, and is not exposed to any unencrypted personal information 106.

FIG. 5 is a block diagram of an example client device 102, showing example component modules, according to an embodiment. In an implementation, the client device 102 includes a memory 502, a control module 504, a display module 506, and a communication module 508. In alternate implementations, a client device 102 includes fewer, additional, or alternative components. Further, one or more of the modules may be combined or located remotely.

In an implementation, the memory component 502 is arranged to store personal information 106 of a user 108. Additionally, the memory 502 may store firmware and/or software for the functionality and operation of the client device 102, including processor-executable instructions for performing the personal information 106 transfer as described herein. For example, the memory component 502 may include one or more of random-access memory, read-only memory, flash memory, portable memory, solid-state memory, magnetic-based or optical memory components, and the like.

In an implementation, the control module 504 is arranged to encrypt a portion of the personal information 106 using the received transport token. For example, the control module 504 encrypts the information 106 in response to input received from the user 108 to privately reveal the portion of the personal information 106 to a third-party website 110. In various implementations, the transport token may include any of various encryption tokens, and may be represented by a unique ID, such as an alpha-numeric string, a graphic image, or the like.

In an implementation, the control module 504 is arranged to automatically retrieve personal information 106, such as address information for example, of the user 108 from the memory component 502, when the client device 102 receives a request for such personal information 106 as part of a transaction.

Figure 6:
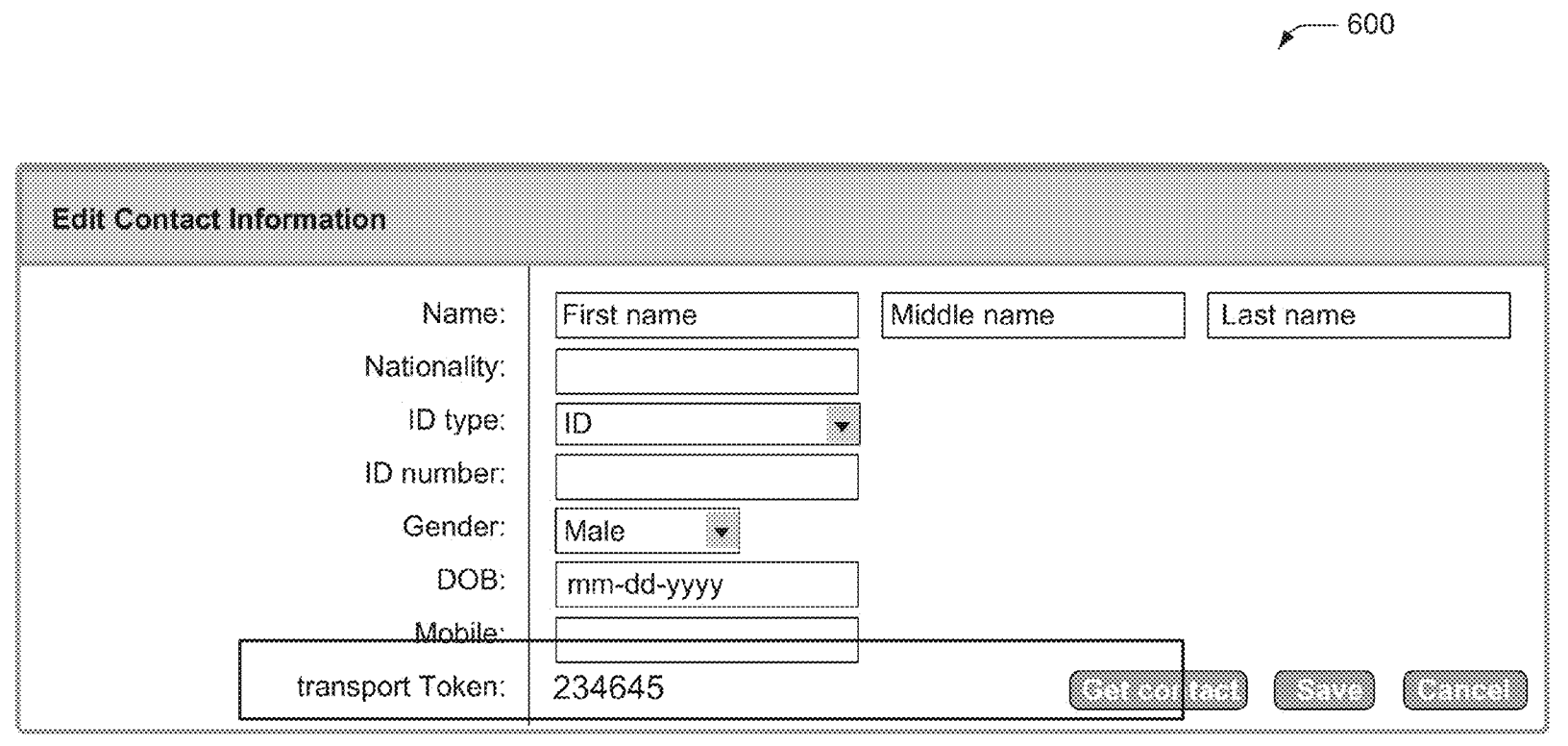

In an implementation, the display module 506 is arranged to display the received transport token and the portion of the personal information 106 to the user 108 (see FIG. 6). For instance, the display module 506 is arranged to display personal information 106 (such as the address information, for example) for user 108 verification, in response to a request from the third-party website 110 for user address information.

FIG. 7 shows another example of a user interface 700 of the client device 102 display component 506, according to an embodiment. For example, the example UI 700 of FIG. 7 illustrates a screen for selecting or verifying user 108 personal information 106 for a transaction. The user 108 can select the portions of personal information 106 (e.g., phone number, ID, birthday, etc.) that apply and that the user 108 desires to send to the site 110, input the transport token, and initiate the transfer (e.g., click the "upload" button, or the like).

In an example, the display module 506 may include a graphic display component (e.g., an LED, LCD, etc. display screen, or the like), and may also include input capabilities (e.g., a touchscreen, or similar). In such an implementation, the user 108 may make inputs to the client device 102 via the display module 506. Alternately, other input components (e.g., separate keypad, etc.) may also be included in addition to the display module 506.

In an implementation, the communication module 508 is arranged to send the encrypted portion of the personal information 106 to the third-party website 110, in response to receiving authorization from the user 108. In an implementation, the communication module 508 is arranged to send the encrypted portion of the personal information 106 to the third-party website 110 via the one or more remote proxy servers 104 and without exposing unencrypted personal information 106 to the one or more remote proxy servers 104. In other words, the communication module 508 sends the encrypted portion of the personal information 106 to a remote proxy server 104, and the server 104 forwards the encrypted portion of the personal information 106 to the third-party website 110. In the implementations, the communication module 508 does not make personal information 106 available until it has been encrypted.

In various examples, the communication module 508 includes communication components, including hardware, firmware, software, etc. for performing data transfer via a network, such as the Internet, for example. In one example, the communication module 508 includes communication components for communicating via one or more standard open data formats or protocols (e.g., odata, xml, json, etc.). Accordingly, the information transfer can proceed from the client device 102 to the site 110 using standard open data formats, without exposing the personal information 106 to undesired elements (including the remote server(s) 104).

In an implementation, the communication module 508 is arranged to process personal information synchronization, as described above with reference to FIG. 4. For example, the communication module 508 sends encrypted personal information 106 to a remote proxy server 104, and the server 104 forwards the encrypted personal information 106 to the communication module 508 of another client device 102. In an example, this may be performed using an open data standard, however, the remote proxy server 104 is unable to read the encrypted portion of the personal information 106 and has no access to unencrypted personal information 106.

Portions of the subject matter of this disclosure can be implemented as a system, method, apparatus, or article of manufacture using standard programming and/or engineering techniques to produce software, firmware, hardware or any combination thereof to control a computer or processor (such as control module 504, for example) to implement the disclosure. For example, portions of an example system 100 may be implemented using any form of computer-readable media (shown as memory 502 in FIG. 5, for example) that is accessible by the control module 504. Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory 502 is an example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic disks or other magnetic storage devices, or any other medium which may be used to store the desired information and which may accessed by the control module 504.

In contrast, communication media typically embodies computer readable instructions, data structures, program modules, or other data in a modulated data signal, such as a carrier wave, or other transport mechanism.

Moreover, those skilled in the art will appreciate that the innovative techniques can be practiced with other computer system configurations, including single-processor or multi-processor computer systems or devices, hand-held computing devices, microprocessor-based or programmable consumer or industrial electronics, and the like.

Figure 8:
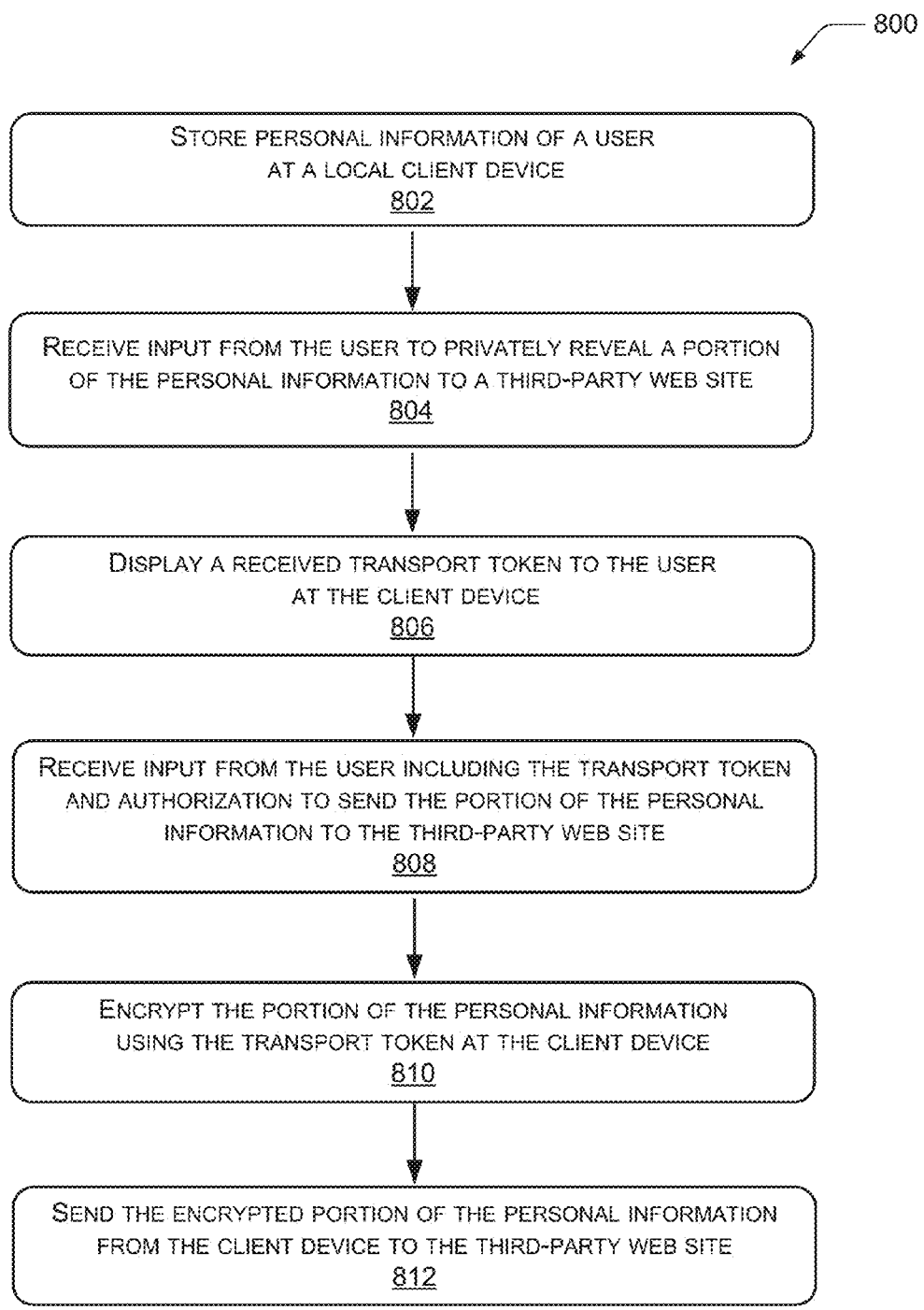
FIG. 8 is a flow diagram illustrating an example process for securely transferring personal information from a client device to a third-party website.

FIG. 8 is a flow diagram illustrating an example process 800 for securely transferring personal information to a third-party website (such as third-party website 110, for example), according to an implementation. The process 800 describes storing personal information at a local client device (such as client device 102, for example) and encrypting at least a portion of the personal information so that the third-party website can decrypt and retrieve the personal information, but so that a remote proxy server facilitating the personal information transfer between the client device and the third-party website cannot read the encrypted personal information and has no access to unencrypted personal information. The process 800 is described with reference to FIGS. 1-7.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented with any suitable components, or combinations thereof, without departing from the scope of the subject matter described herein.

In an implementation, the process includes registering the client device to a remote proxy server (such as server 104, for example), for passing encrypted personal information to third-party websites. In various implementations, the client device includes one of a smartphone, a personal digital assistant, a desktop computing device, a mobile computing device, a wearable computing device, a digital tablet device, or like system or device.

At block 802, the process includes storing personal information of a user at such a local client device. In various examples, the personal information may be password protected, or otherwise secured, as discussed above. At block 804, the process includes receiving input from the user to privately reveal a portion of the personal information to a third-party website. For instance, the user may be conducting a transaction at the website.

At block 806, the process includes displaying a received transport token to the user at the client device. For example, the process may include receiving the transport token from the third-party website. In some examples, the transport token is generated at the third-party website. In an implementation, the transport token is sent from the third party website to the client device by a remote proxy server.

At block 808, the process includes receiving input from the user, where the input includes the transport token and authorization to send the portion of the personal information to the third-party website. At block 810, the process includes encrypting the portion of the personal information using the transport token at the client device in response to the input from the user.

At block 812, the process includes sending the encrypted portion of the personal information from the client device to the third-party website. In an example, the third-party website decrypts the portion of the personal information using the transport token, and deletes the portion of the personal information after fulfillment of the transaction. In an implementation, the encrypted portion of the personal information is sent from the client device to the third-party website by a remote proxy server. In the implementation, the remote proxy server is unable to read the encrypted portion of the personal information and has no access to unencrypted personal information.

In an implementation, the process includes a synchronization of personal information between client devices of the user. In the implementation, the process includes encrypting the personal information at one client device, synchronizing the personal information with another client device via a remote proxy server, and decrypting the personal information at the other client device. In the example, the remote proxy server acts as a broker only, and does not store any personal information. Additionally, the remote proxy server is unable to read the encrypted personal information and is not exposed to unencrypted personal information.

In an implementation, the client device, the third-party website, and the remote proxy server send and/or receive the encrypted portion of the personal information via a standardized open data protocol, as discussed above.

In various implementations, one or more computer readable storage media (as described above) include computer executable instructions that, when executed by a computer processor, direct the computer processor to perform operations including at least a portion of the process 800.

In alternate implementations, other techniques may be included in the process in various combinations, and remain within the scope of the disclosure.

Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations. For example, the methodological acts need not be performed in the order or combinations described herein, and may be performed in any combination of one or more acts.

What is claimed is:

1. A system, comprising:
   a client device, including,
      a memory component on the client device, the memory component is arranged to securely store personal information of a user via a password,
      a control module arranged to encrypt requested personal information requested by a third-party website using a received transport token from the third-party website, in response to a first input received from the user to privately reveal the requested personal information to the third-party website after the user has already logged in to the third-party website, wherein the transport token comprises an encryption token and is generated by the third-party website, the personal information is used to complete a transaction between the user and the third-party website,
      a display module arranged to display the received transport token and the requested personal information to the user for verification by the user, and
      a communication module arranged to send the encrypted requested personal information to the third-party website, in response to a second input from the user comprising the transport token and authorization to send the requested personal information to the third-party website for decryption by the third-party website using the transport token to complete the transaction; and a server component arranged to receive the transport token from the third-party website and to send the transport token to the client device, and arranged to send the encrypted requested information from the client device to the third-party website, the server component being unable to read the encrypted requested personal information and having no access to unencrypted personal information.

2. The system of claim 1, further comprising another client device, and wherein the server component is arranged to synchronize the personal information between the client device and the other client device, the personal information being encrypted during the synchronization.

3. The system of claim 1, wherein the server component is arranged to communicate with the client device and/or the third-party website via a standardized open data protocol.

4. A client device, comprising:
a memory component arranged to store personal information of a user;
a control module, the control module configured to encrypt requested personal information of a user by a request from a third-party website to complete a transaction between the user and the third-party website after the user has logged in to the third-party website, wherein the requested personal information of the user is encrypted using a transport token comprising an encryption token received from the third-party website via a remote server component, the transport token is generated by the third-party website;
a display module arranged to display the received transport token and the personal information to the user for verification by the user; and
a communication module arranged to send the encrypted requested personal information to the third-party website via the remote server component, the encrypted requested personal information is decrypted by the third-party website using the transport token to complete the transaction, wherein the remote server component is unable to read the encrypted requested personal information and has no access to unencrypted personal information.

5. The client device of claim 4, wherein the communication module is arranged to send the encrypted requested personal information to the third-party website via one or more remote proxy servers and without exposing unencrypted requested personal information to the one or more remote proxy servers.

6. The client device of claim 5, wherein the one or more remote proxy servers are arranged to identify the client device during the third-party website request, based on prior registration of the client device with the one or more remote proxy servers.

7. The client device of claim 4, wherein the communication module is further arranged to send the encrypted requested personal information to a remote proxy server arranged to forward the encrypted requested personal information to the third-party website using an open data standard, the remote proxy server being unable to read the encrypted requested personal information and having no access to unencrypted personal information.

8. The client device of claim 4, wherein the control module is arranged to encrypt the requested personal information using a local password and to share the encrypted requested personal information with another client device via a remote proxy server that is unable to read the encrypted requested personal information.

9. The client device of claim 4, wherein the control module is arranged to automatically retrieve address information of the user from the memory component and the display module is arranged to display the address information for user verification, in response to the request from the third-party website for user address information to complete the transaction.

10. A method, comprising:
storing personal information of a user at a local client device;
receiving a first input from the user to privately reveal requested personal information to a third-party website to complete a transaction between the user and the third-party website after the user has logged in to the third-party website;
displaying a received transport token from the third-party website via a remote server component to the user at the client device, the transport token comprises an encryption token;
receiving a second input from the user comprising the transport token and authorization to send the requested personal information to the third-party website;
encrypting the requested personal information using the transport token at the client device; and
sending the encrypted requested personal information from the client device to the third-party website via the remote server component for decryption by the third-party website to complete the transaction.

11. The method of claim 10, further comprising registering the client device to a remote proxy server, for passing the encrypted requested personal information to third-party websites.

12. The method of claim 10, further comprising receiving the transport token from the third-party website via the remote server component.

13. The method of claim 10, further comprising:
encrypting the personal information at the client device;
synchronizing the personal information with another client device via a remote proxy server; and
decrypting the personal information at the other client device.

14. The method of claim 10, wherein the transport token is sent from the third-party website to the client device by a remote proxy server.

15. The method of claim 10, wherein the encrypted requested personal information is sent from the client device to the third-party web site by a remote proxy server.

16. The method of claim 15, wherein the remote proxy server is unable to read the encrypted requested personal information and has no access to unencrypted personal information.

17. The method of claim 15, wherein the client device, the third-party web site, and the remote proxy server send and/or receive the encrypted requested personal information via a standardized open data protocol.

18. The method of claim 10, wherein the third-party website decrypts the encrypted requested personal information using the transport token, and deletes the encrypted requested personal information after fulfillment of a transaction.

19. The method of claim 10, wherein the client device comprises one of a smartphone, a personal digital assistant, a desktop computing device, a mobile computing device, a wearable computing device, or a digital tablet device.

\* \* \* \* \*